United States Patent [19]
Shea et al.

[11] Patent Number: 5,552,666
[45] Date of Patent: Sep. 3, 1996

[54] COMPACT FLUORESCENT LAMP

[75] Inventors: Michael J. Shea, Salem; Jakob Maya, Brookline; Dominic Barbuto, Framingham, all of Mass.

[73] Assignee: Matsushita Electric Works Research and Development Laboratory Inc., Woburn, Mass.

[21] Appl. No.: 307,515

[22] Filed: Sep. 16, 1994

[51] Int. Cl.[6] ................................................. H01J 61/30
[52] U.S. Cl. ........................................... 313/493; 313/634
[58] Field of Search ..................................... 313/493, 634

[56]  References Cited

U.S. PATENT DOCUMENTS 4,659,962  4/1987  Hitoshi et al. ........................ 313/493
4,855,635  8/1989  Grossman et al. .................... 313/493

Primary Examiner—Sandra L. O'Shea
Assistant Examiner—Vip Patel

[57]  ABSTRACT

A compact fluorescent lamp has a pair of fluorescent arc tubes (16, 18) disposed within a spherical bulbous, translucent envelope (24). The arc tubes (16, 18) are substantially U-shaped and are oriented such that one leg of the U-shape of an arc tube extends between the legs of the other arc tube. The arc tubes (16, 18) are connected to a single ballast to provide power to the lamp.

17 Claims, 4 Drawing Sheets

COMPACT FLUORESCENT LAMP

BACKGROUND OF THE INVENTION

The present invention relates to fluorescent lamps, and more particularly to a fluorescent lamp which is compact in size, has a high lumen output for its packaged dimensions, and is capable of being operated at a variable lumen output.

Compact fluorescent lamps found on the market today generally comprise a single fluorescent tube which has been folded several times allowing it to fit into a small space and therefore, giving this type of lamp access to the market which has previously been the exclusive domain of incandescent lamps. These compact fluorescent lamps are desirable replacements for incandescent lamps primarily because they provide an efficient light source having a range of power and light output in the area of 5 to 55 watts with 250 to 4800 lumens. Compact fluorescent lamps are therefore more efficient at converting electrical energy to visible light than incandescent lamps and typically deliver 50 to 60 lumens per watt, while the efficiency of an incandescent lamp is 16 lumens per watt. Thus, replacement of incandescent lamps with compact fluorescent lamps can yield substantial energy savings.

Furthermore, incandescent lamps have a lifetime of only about 750 hours while compact fluorescent lamps are capable of lasting from 6,000 to 10,000 hours. Additionally, in a commercial environment, where replacement of light bulbs incurs labor costs, the less often a bulb requires changing, the more economical the installation.

Electric utilities also desire to reduce the peak load demand by supporting energy conservation, as the construction of additional power generating facilities, or running less efficient auxiliary generators to accommodate a peak load, is costly. Utilities have therefore, found it highly economical to support energy saving devices such as compact fluorescent lamps to reduce peak load. This has given a large boost to the entire field of compact fluorescent lamp development.

Reducing the size of a compact fluorescent lamp in order to expand its applicability has been a goal of the lighting industry, however problems of thermal management become increasingly prohibitive as the dimensions of the lamp shrink. Compact fluorescent lamps generally comprise a glass envelope with a phosphor coating on its interior surface, each end of the lamp having an oxide coated electrode, the oxide coating serving to enhance electron emission. The glass envelope, during operation, has about six millitorr vapor pressure of mercury and several torr of a rare gas, e.g., argon, and a low pressure discharge is maintained between the two electrodes causing the mercury to emit visible and ultraviolet radiation, the ultraviolet radiation being converted to visible light by the phosphor coating. The performance of the lamp is therefore strongly dependent upon the mercury pressure in the lamp, which increases with temperature.

With a typical ambient temperature of 25° C. some of the heat generated by the discharge beneficially warms the cold spot to the ideal temperature of about 40° C. and at this temperature, the vapor pressure of mercury delivers the maximum ultraviolet radiation to the phosphor coated walls. Standard fluorescent lamps have been engineered to operate at the ideal temperature, however the domain of compact fluorescent lamps is in compact applications. Therefore, to attain the desired luminous flux from a compact fluorescent lamp, while maintaining its compactness, requires that the wall loading or power per unit surface area be increased over that from a standard fluorescent lamp. This causes the cold spot temperature of the compact fluorescent lamp to rise beyond the ideal of 40° C., and the efficiency of the lamp drops.

There are basically two methods for solving this problem. A region of the glass envelope can be cooled by changing its geometry or by heat sinking it. Because the mercury vapor fills the entire volume of the glass envelope, cooling any small portion of that envelope will effectively control the mercury pressure anywhere in the lamp. This method has the disadvantage of constraining the possible geometries available to a lamp designer, and furthermore the application of the compact fluorescent lamp in a fixture may obviate advantages gained by altering the geometry.

The second solution is to use an amalgam of mercury and a metal such as indium which has a lower vapor pressure than mercury itself. Without such an amalgam, the efficiency of a compact fluorescent lamp is within 10% of its optimum over a narrow 25° C. range centered at about 40° C. With an amalgam, the range is shifted to higher temperatures, specifically tailored to those encountered in a compact fluorescent lamp, and the efficiency is within 10% of its optimum over a range of 40° C.–120° C. This makes the lamp both efficient at the nominal operating temperature of the lamp and makes it insensitive to departures from the specified operating temperature. However, the mercury pressure takes longer to become established because the lamp has a longer warm-up time, thus delaying the time at which the lamp attains its maximum light output.

An additional problem resulting from overheating is the degradation of the electronic ballast. The addition of an integral electronic ballast to compact fluorescent lamps expands their applicability, but it also thermally couples the lamp to the electronics. This and the compactness of the source, causes the temperature of the components to rise and shortens their useful life.

It is also found that as the size of the compact fluorescent lamp is reduced, the phosphor loading (power per unit surface area covered with phosphor) increases, leading to faster phosphor light output deterioration. This is due to the density of damaging species that impinge on the phosphor. Mercury ions tend to sputter the phosphor and implant themselves causing darkening, which inhibits the generation and transmittance of visible radiation. Radiation can also damage the phosphor, in particular, the 185.0 nm mercury radiation is somewhat damaging to the phosphor. Under normal operating conditions of the compact fluorescent lamp, that is a cold spot temperature of 40° C., the amount of 185.0 nm radiation is only about 6%. However, as the temperature goes up this percentage increases to as much as 20–30% depending on the temperature. Phosphors have been improved so that they can withstand a higher wall loading, yet they remain a weak link in the longevity of compact fluorescent lamps. One method of protecting the phosphor is to coat it with a thin film of alumina the coating being transparent to ultraviolet radiation, allowing the ultraviolet radiation to strike the phosphor and generate visible light, while shielding the phosphor from damaging species.

Packaging therefore remains a problem for compact fluorescent lamps making them in many instances an unsuitable retrofit for many incandescent applications. They do not fit into many standard fixtures for incandescent applications which seriously hinders the use of compact fluorescent lamps as retrofit replacements for incandescent lamps.

It is therefore an object of the present invention to provide a compact fluorescent lamp which overcomes the various disadvantages of those compact fluorescent lamps of the prior art, and which is simple to manufacture, employing readily available components.

A further object of the present invention is to provide a compact fluorescent lamp which the light output can be varied during operation.

Yet another object of the invention is to provide a compact fluorescent lamp which may be constructed from currently manufactured components and operated from a single ballast for simplicity.

Yet another object of the present invention is to provide a configuration for arc tubes that utilizes space in an optimum fashion without necessitating the development of new manufacturing equipment for making the lamps.

SUMMARY OF THE INVENTION

The above objects and other objectives which will become apparent as the description proceeds are achieved by providing a compact fluorescent lamp comprising a translucent envelope having a pair of substantially U-shaped fluorescent arc tubes disposed within the envelope, the arc tubes being mounted with one leg of the U-shape of one arc tube extending between the legs of the other arc tube and a ballast means for providing power to the arc tubes.

The arc tubes may comprise a U-shape which consists of a pair of tubes in side by side relation interconnected at one end to form the U-shape. Further, the arc tubes are generally mounted on a base which may serve to house a single ballast which provides power for both of the arc tubes.

Means may be provided for cooling the interior of the bulbous, translucent envelope by forming a plurality of openings in the translucent envelope and/or in the base. Furthermore low thermal conductivity barriers may be introduced between the ballast and the lamp housing.

The compact fluorescent lamp generally has a ratio of the total volume of the arc tubes to the volume of the translucent envelope which is in the range of 0.3 to 0.5 or stated in another way, the volume of the arc tubes is about 40% of the volume of the translucent envelope which is generally spherical in configuration which results in a superior utilization of space compared to other compact fluorescent lamps.

BRIEF DESCRIPTION OF THE DRAWINGS

Reference is made to the accompanying drawings in which there are shown illustrative embodiments of the invention from which its novel features and advantages will be apparent, wherein.

DESCRIPTION OF THE PREFERRED EMBODIMENT

Figure 1:
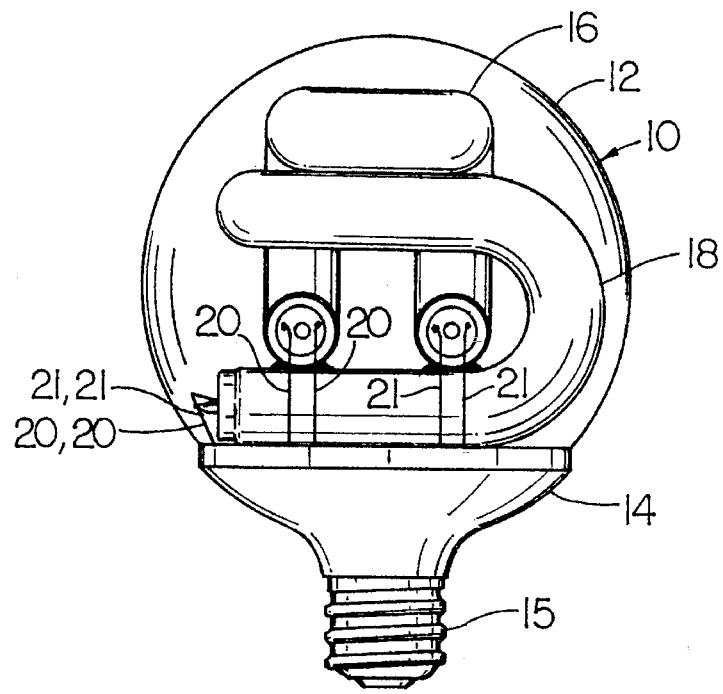
FIG. 1 is a side elevational view showing a compact fluorescent lamp constructed in accordance with the teachings of the present invention.

Referring now to the drawing and in particular to FIG. 1 there is shown a compact fluorescent lamp 10 comprising a translucent envelope 12 which is mounted on a base 14 having a threaded portion 15 which is formed so as to be acceptable in a socket designed for an incandescent lamp.

A pair of substantially U-shaped fluorescent arc tubes 16 and 18 are disposed within the envelope 12, the arc tube 18 being mounted on the upper surface of the base 14 and the arc tube 16 being mounted on the arc tube 18, the fixing of the arc tube 18 to the upper surface of the base and the fixing of the arc tube 16 to the arc tube 18 being accomplished by employment of an adhesive as is well known in the art.

Figure 4:
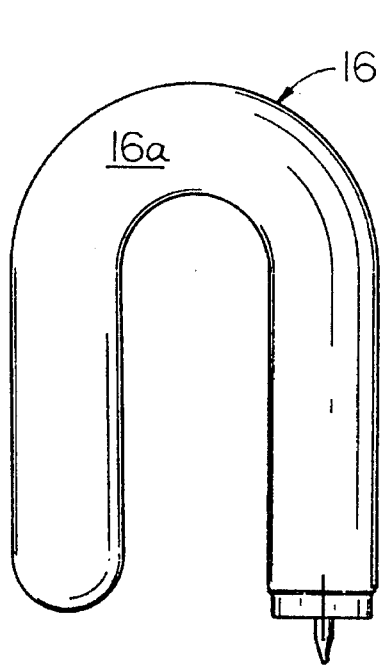
FIG. 4 is a side elevational view showing an arc tube employed in the construction of the compact fluorescent lamp of FIGS. 1, 2 and 3.
Figure 5:
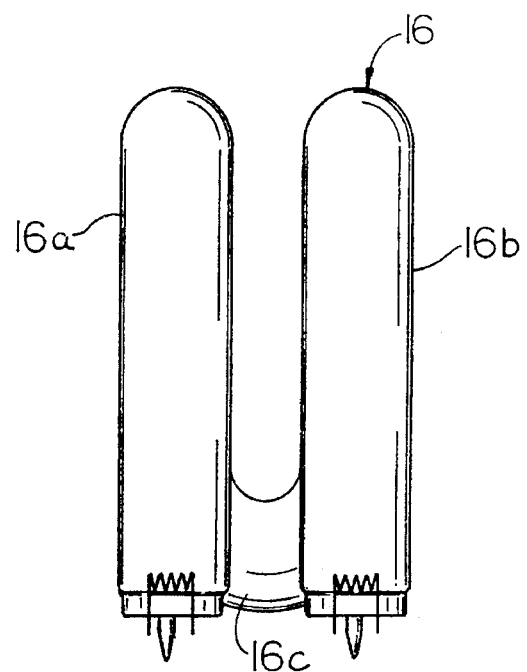
FIG. 5 is a front elevational view showing further details of the arc tube of FIG. 4.

The arc tubes 16 and 18 are identical in configuration, and as shown in FIGS. 4 and 5 (arc tube 16 only) present a U-shape in profile (as in FIG. 4) but are in effect an elongated tube which is formed in a U-shape consisting of two portions 16a and 16b which are disposed in side by side relation and interconnected by a portion 16c to form the required U-shape. Lamps of this configuration may be manufactured by present day machinery and are presently available, one such lamp being a EFG 16EL fluorescent arc tube manufactured by Matsushita Electric Corporation and marketed under the corporate brand names of Panasonic and National and employed as a single tube in lamps available in the marketplace. These lamps have U-shaped arc tubes which are each formed of a first U-bend at about the middle thereof to form two legs and each of the two legs are bent at about their middles to form two second U-bends.

Referring back to FIG. 1, it will be noted that the arc tube 16 and the arc tube 18 are mounted such that one leg of either U-shaped tube extends between the legs of the other U-shaped tube, each of the tubes having a pair of electrical leads 20 extending from one end of the tube and 21 extending from the opposite end of the tube which are connected to a single ballast (not shown) disposed within the base 14. It has been found by orienting the arc tubes 16 and 18 with the legs of each so disposed, the envelope 12 may be constructed of a volume wherein the ratio of the volume of the arc tubes 16 and 18 to the volume of the envelope 12 is in the range of 0.3 to 0.5. The total volume of the arc tubes 16 and 18, that is the volume of light producing elements, is therefore about 40% of the volume of the translucent envelope 12.

The envelope 12 in the present embodiment is presently 9.5 centimeters in diameter and is manufactured of a glass with a diffusive coating applied to the interior. However, the lamp may be also operated with a clear bulb, the only criteria being that the dimensions of the envelope are of a sufficient volume to contain the arc tubes 16 and 18 when the arc tubes are bent to the configuration disclosed, within the limits of arc tube construction practices. The arc tubes 16 and 18 are constructed of glass and contain a dose mercury and a rare gas such as argon. During operation the mercury emits ultraviolet and visible radiation, the phosphor coating on the inner surface of the arc tubes 16 and 18 allowing the visible radiation to pass and converting the ultraviolet radiation to visible light. The discharge is maintained through each arc tube 16 and 18 between a cathode secured at either end of the tube.

Figure 2:
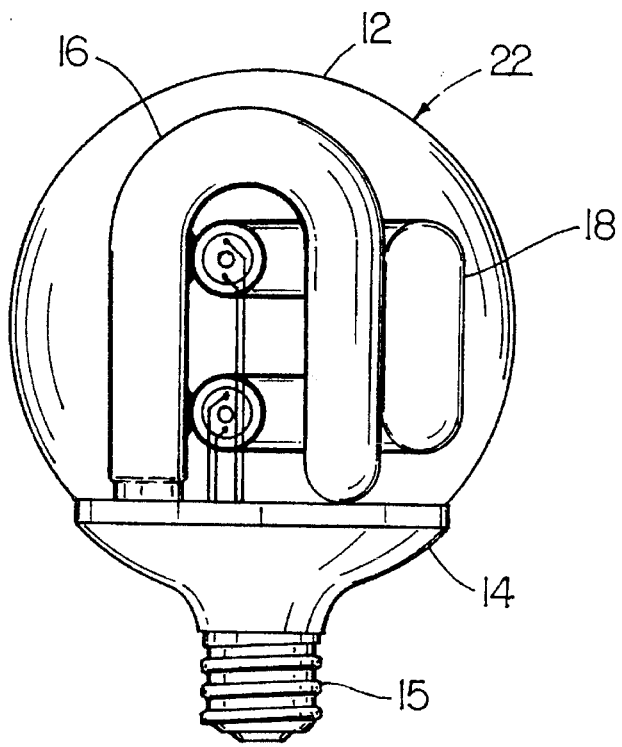
FIG. 2 is a side elevational view similar to FIG. 1 showing an alternate embodiment of the invention.
Figure 3:
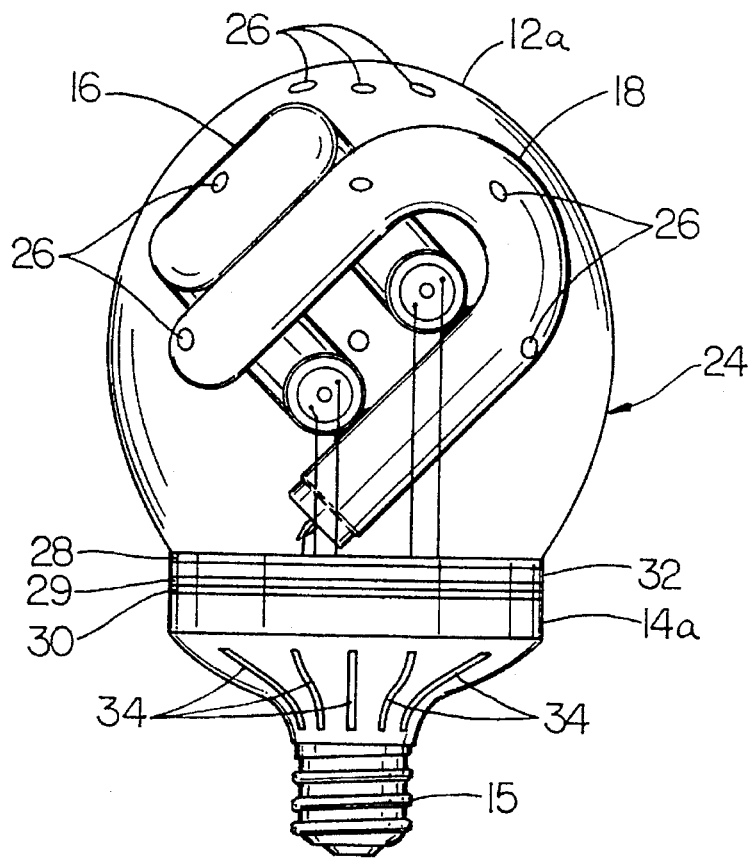
FIG. 3 is a side elevational view similar to FIGS. 1 and 2 showing a further alternate embodiment of the invention.

Referring now to FIGS. 2 and 3, there is shown in FIG. 2 an alternate embodiment of the invention wherein a compact fluorescent lamp 22 comprises a glass envelope 12, a base 14, and a threaded portion 15, like reference numerals in FIGS. 2 and 3 indicating like elements to those shown and described with respect to FIG. 1. However, in the embodiment of FIG. 2, the pair of fluorescent arc tubes 16 and 18 are oriented such that the end of the arc tube 16 is connected to the upper surface of the base 14 however, the arc tubes 16 and 18 however being maintained in a configuration wherein one leg of a U-shaped arc tube 16 or 18 extends between the legs of the other U-shaped arc tube 16 or 18, and maintaining the volume ratios as set forth above which are intended to produce maximum light output for the volume of the envelope 12.

In FIG. 3 there is shown yet another embodiment of the invention wherein the pair of fluorescent arc tubes 16 and 18 are mounted in a compact fluorescent lamp 24 in a canted orientation. However, as in the previously described embodiments, the arc tubes are still mounted with one leg of the U-shape of an arc tube extending between the legs of the other arc tube for optimum lighting purposes. The compact fluorescent lamp 24 however takes into consideration the cooling requirements which may arise when the optimum ratio of arc lamp volume to envelope volume is achieved. As will be observed in FIG. 3, the compact fluorescent lamp 24 is provided with an envelope 12a having a plurality of perforations 26 formed therein. It should be realized that the number and location of the perforations 26 which are shown as circular, but may be openings of any shape, may be varied as desired, only a few being shown for descriptive purposes in FIG. 3. The compact fluorescent lamp 24 further has a base 14a which contains the ballast (not shown) which is provided with layers 28, 29, 30 and 32 of materials having low thermal conductivity. A plurality of slotted openings 34 are also formed in the base. The layers 28, 29, 30 and 32 and the slotted openings 34 are provided to cool the internal area of the base containing the ballast.

Figure 6:
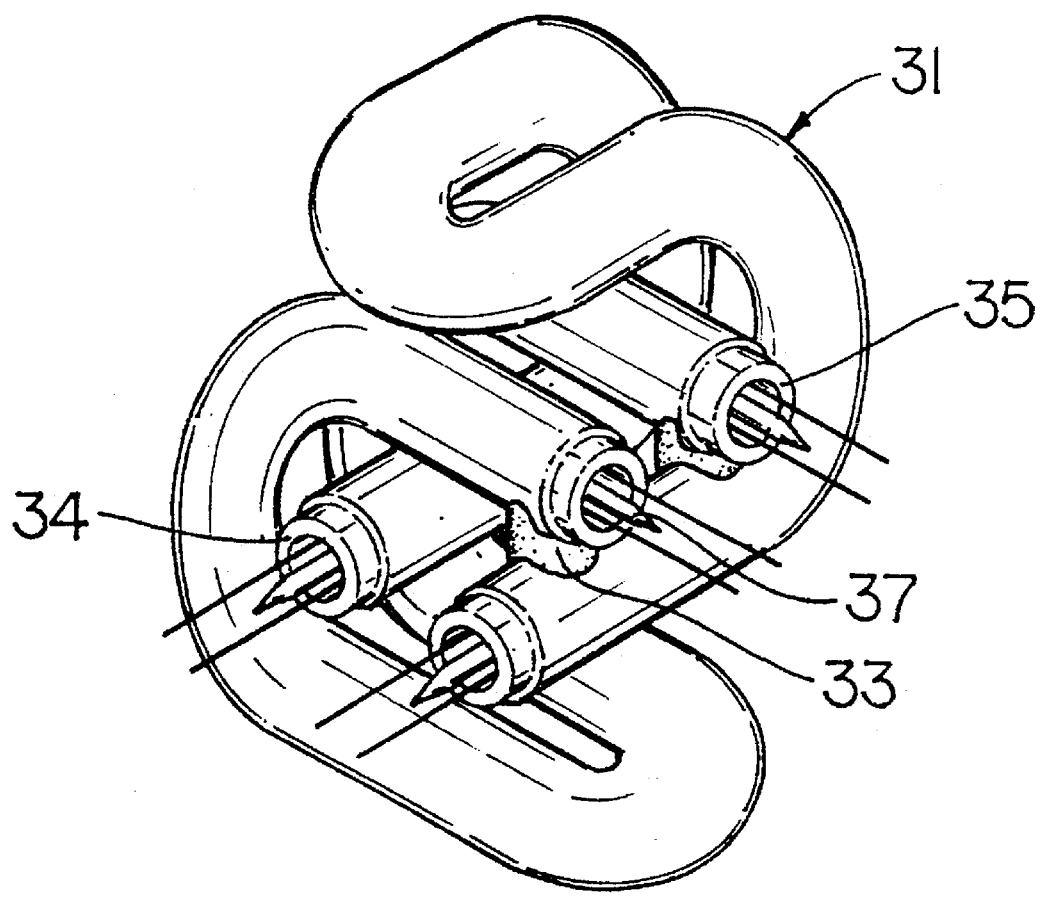
FIG. 6 is side elevational view of an alternative embodiment of a compact fluorescent lamp arc tube that can be used in the envelopes shown in FIGS. 1, 2 and 3. In this embodiment the interiors of two arc tubes are joined together by a passageway adjacent ends of each of the tubes.

Referring now to the alternative embodiment shown in FIG. 6, arc tubes 31 and 32 are identical in configuration and present U-shape profiles as discussed above but are in effect a single elongated tube formed in two segments. The interiors of the sidewalls of each of the tubes 31 and 32 are joined together by a glass bridge 33 which joins two openings, one in each of tubes 31 and 32. Tubes 31 and 32 are formed in a U-shape configuration in the same manner as described with reference to FIGS. 1 to 5, except that the tubes are interconnected with the glass bridge 33. Only one cathode 34 is disposed in tube 31 and only one cathode 35 is disposed in lamp 32. The other ends, 36 and 37 are glass seals without electrodes disposed therein. An arc will form in the serpentine path between cathode 34 and cathode 35 through the bridge 33.

Lamps of this configuration may be manufactured by present day machinery and are presently available, one such lamp being a EFG 16EL fluorescent arc tube manufactured by Matsushita Electric Corporation and marketed under the corporate brand names of Panasonic and National and employed as a single tube in lamps available in the marketplace.

Referring back to FIG. 1, it will be noted that the arc tube 16 and the arc tube 18 are mounted such that one leg of either U-shaped tube extends between the legs of the other U-shaped tube, each of the tubes having a pair of electrical leads 20 extending from one end of the tube and 21 extending from the opposite end of the tube which are connected to a single ballast (not shown) disposed within the base 14. It has been found by orienting the arc tubes 16 and 18 with the legs of each so disposed, the envelope 12 may be constructed of a volume wherein the ratio of the volume of the arc tubes 16 and 18 to the volume of the envelope 12 is in the range of 0.3 to 0.5. The total volume of the arc tubes 16 and 18, that is the volume of light producing elements, is therefore is about 40% of the volume of the translucent envelope 12.

Figure 7:
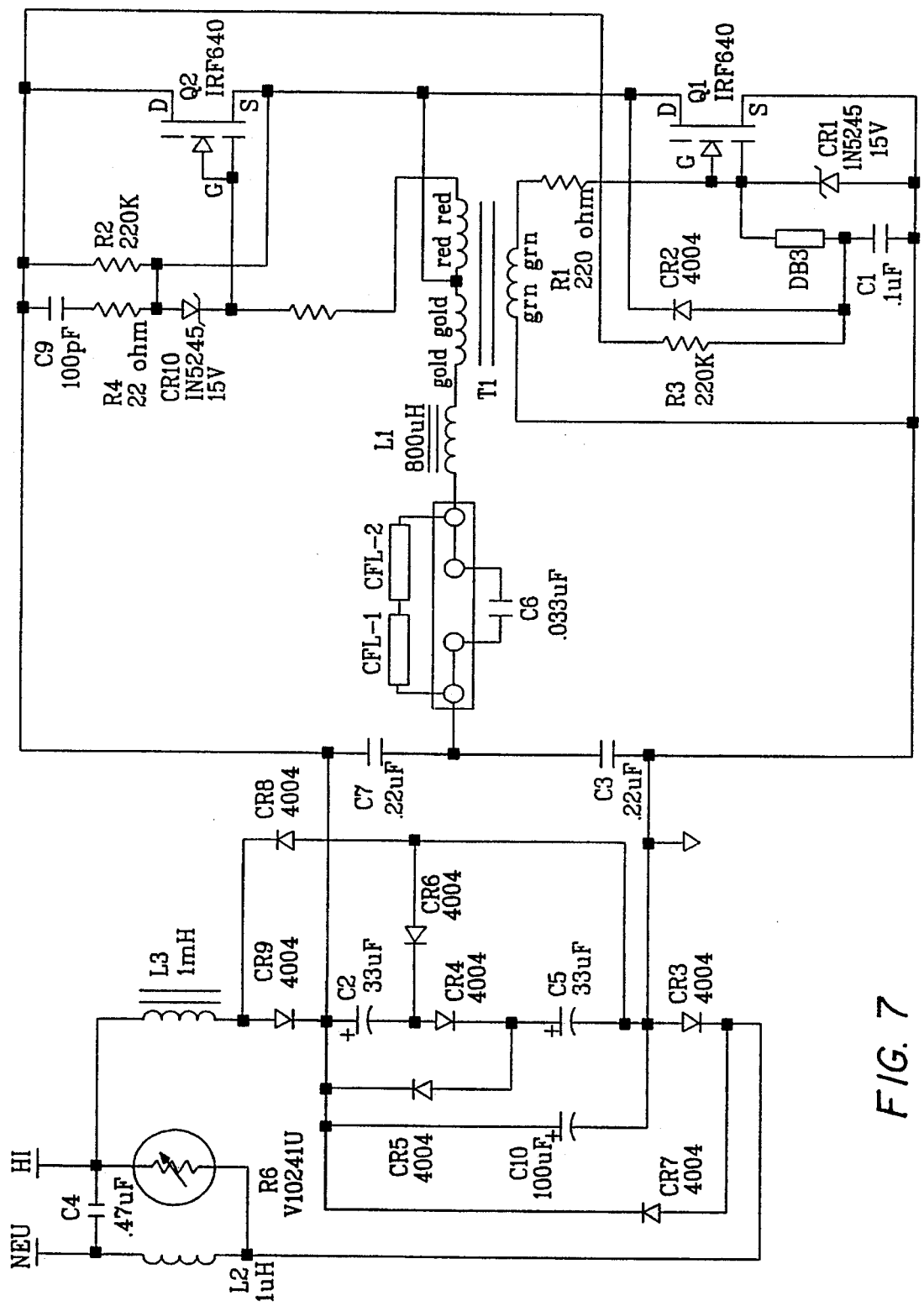
FIG. 7 is a schematic diagram showing the ballast circuit employed to drive the arc tubes employed in the compact fluorescent lamps of FIGS. 1, 2, 3 and 6.

A schematic diagram in block form depicting an integral ballast employed in the subject invention is shown in FIG. 7. The ballast which initiates and maintains the discharge of the lamp and is secured within the base 14, operates at 31 khz to 33 khz to deliver 13 to 18 watts to each fluorescent arc tube 16 or 18 and supplies 700 volts for starting the lamp. The ballast delivers specified power over an input voltage range between 90 volts to 130 volts and is connected to the main outlet by the standard screw-type base 14.

In the ballast of FIG. 6, the more or less standard 120 volt input, 27 watt output electronic ballast employed with a single fluorescent arc tube has been modified using an additional choke. The electronic ballast consists of a four-way bridge rectifier with filtering to provide a 140 volt to a 170 volt DC supply. This provides power to a free running oscillator whose frequency is approximately 31 to 33 khz and is determined by an LC network. The LC circuit itself is driven by two FETs in a push-pull arrangement (each output being driven on with a 180° phase shift, one from the other). The arc tubes 16 and 18 are connected in series, as shown in FIG. 6 the operating frequency being between 31 and 33 khz, which is the same as the LC frequency. The 120 volt input, 27 watt output electronic ballast as modified achieve an output of 32 watts of power at 100 volt AC input by changing the Q1 and Q2 components from IRF624 to IRF640 which drives the lamps harder and results in the FETs operating cooler. The C6 component was changed to a value of 0.033 microfarad from the standard 0.022 microfarad to increase the lamp current and the C10 was added to supply an increase in DC filtering of the DC power supply thereby increasing the average power to the lamp.

In spite of the additional circuit elements and one additional arc tube over the standard lamp driven by a typical electronic ballast of this type, the size of the entire package is not appreciably increased and approximately twice the lumen value is provided by simultaneously powering the two fluorescent arc tubes 16 and 18 which are responsible for light emission, instead of one arc tube as is done in the standard lamp.

As should be evident from the description above, one of the primary features of the present invention lies in the multilevel lumen output of the compact fluorescent lamp 10. The lamp can be operated with one arc tube, 16 or 18 energized or with both running simultaneously to double the lumen value. The choice of operating conditions can be controlled with the on-off switch, toggling it the proper number of times to achieve the desired lumen level. A manual switch could be employed to energize one tube or both tubes similar to the multilevel switch discussed above.

In the preferred embodiment shown in FIG. 1, the lamp was operated vertically, base up after a warm-up and 100 volt input voltage. The light output was 1460 lumens with 34.6 watts of input power, yielding 42 lumens per watt. When the lamp was operated base down at 100 V input voltage the light output was 1455 lumens at 35.0 watts yielding an efficiency of 42 lumens per watt. It is considered that it is entirely within the scope of the invention to increase the power delivered to the lamp by the electric circuit such as to obtain 1750 lumens to suit the market requirements for higher lumen packages. While the increased temperature may require a change in amalgam composition, it is well known that amalgams are used to extend the temperature range where lamps emit with optimum efficacy. In addition, amalgams make it possible for the light source to operate at a higher ambient temperature and still have optimum efficacy. Depending on the amalgam composition, the range of useful or optimum output differs. However, it is possible to choose two different amalgams for the two arc tubes 16 or 18 in such a manner that the optimum efficacy regions dovetail to yield a much wider temperature region of operation.

A variation of the compact fluorescent lamp 10 could be employed to adjust the spectral power distribution by applying different phosphors to the different arc tubes. This could specifically tailor the photometric properties of the lamp, such as its correlated color temperature and its color rendering index. For example, if two phosphors are complementary, meaning that the spectral regions of strong emissions for one phosphor do not coincide with that of the other, then output of the combined emission will have a superior coloring rendering index. The compact fluorescent lamp 10 could also combine the spatial distribution with the spectral power distribution which would allow the downlighting portion higher correlated color temperature for task lighting while the ambient room light can be set at a less distracting low correlated color temperature.

While it is apparent that changes and modifications can be made within the spirit and scope of the present invention it is our intention, however only to be limited by the appended claims.

As our invention we claim:

1. A compact fluorescent lamp comprising:
   a bulbous envelope,
   a pair of substantially U-shaped fluorescent arc tubes disposed within said envelope, said arc tubes being mounted with one leg of the U-shape of an arc tube extending between the legs of the other arc tube, and
   ballast means for providing power to said arc tubes.

2. A compact fluorescent lamp as set forth in claim 1 wherein each of said arc tubes comprises an elongated tube formed into a U-shape consisting of tube portions disposed in side by side relation and interconnected at one end to form a U-shaped tube in profile.

3. A compact fluorescent lamp according to claim 1 wherein the U-shaped arc tubes are each formed of a first U-bend at about the middle thereof to form two legs and each of the two legs are bent at about their middles to form two second U-bends.

4. A compact fluorescent lamp as set forth in claim 1 which further includes a base on which said bulbous envelope is mounted.

5. A compact florescent lamp according to claim 3 further including a passageway between the interiors of the two arc tubes and means joining the two arc tubes together at the passageways wherein the interiors of the two arc tubes are in fluid flow communication with each other and electrode means at the end of one of the arc tubes and another electrode means at the end of the other arc tube.

6. A compact fluorescent lamp as set forth in claim 3 wherein said ballast means is disposed in said base.

7. A compact fluorescent lamp as set forth in claim 1 which further includes means for cooling the interior of said bulbous envelope.

8. A compact fluorescent lamp as set forth in claim 7 wherein said cooling means comprises a plurality of openings formed in said bulbous envelope.

9. A compact fluorescent lamp as set forth in claim 1 wherein the ratio of the total volume of said arc tubes to the volume of said bulbous envelope is in the range of 0.3 to 0.5.

10. A compact fluorescent lamp as set forth in claim 1 wherein the volume of said arc tubes is about 40% of the volume of said bulbous envelope.

11. A compact fluorescent lamp as set forth in claim 1 wherein said bulbous envelope is of spherical configuration.

12. A compact fluorescent lamp as set forth in claim 11 which further includes means for cooling the interior of said bulbous envelope.

13. A compact fluorescent lamp as set forth in claim 12 wherein said cooling means comprises a plurality of openings formed in said bulbous envelope.

14. A compact fluorescent lamp as set forth in claim 13 wherein said cooling means further comprises a plurality of openings formed in said base.

15. A compact fluorescent lamp as set forth in claim 11 wherein the ratio of the total volume of said arc tubes to the volume of said bulbous envelope is in the range of 0.3 to 0.5.

16. A compact fluorescent lamp as set forth in claim 11 wherein the volume of said arc tubes is about 40% of the volume of said bulbous envelope.

17. A compact fluorescent lamp as set forth in claim 16 wherein said bulbous envelope is of spherical configuration.

\* \* \* \* \*